United States Patent
Mehr

(10) Patent No.: US 7,434,667 B2
(45) Date of Patent: Oct. 14, 2008

(54) WALL PLATE WITH GLASS PART FOR AN ELEVATOR INSTALLATION

(75) Inventor: Dieter Mehr, Ebikon (CH)

(73) Assignee: Inventio AG, Hergiswil NW (CH)

(*) Notice: Subject to any disclaimer, the term of this patent is extended or adjusted under 35 U.S.C. 154(b) by 454 days.

(21) Appl. No.: 10/932,579

(22) Filed: Sep. 2, 2004

(65) Prior Publication Data

US 2005/0087403 A1    Apr. 28, 2005

(30) Foreign Application Priority Data

Sep. 10, 2003  (EP) ................................. 03405663

(51) Int. Cl.
*B66B 3/00*    (2006.01)
*B66B 9/00*    (2006.01)
*G02F 1/13*    (2006.01)
*G02B 26/02*   (2006.01)

(52) U.S. Cl. .................. 187/396; 187/397; 187/414; 359/227

(58) Field of Classification Search ............... 187/396, 187/397, 414; 359/227–296
See application file for complete search history.

(56) References Cited

U.S. PATENT DOCUMENTS

2008/0043316 A2* 2/2008 Moskowitz ................ 359/296

FOREIGN PATENT DOCUMENTS

| JP | 04333485 |   | 11/1992 |
| JP | 05058576 | A * | 3/1993 |
| JP | 05070060 |   | 3/1993 |
| JP | 05070060 | A * | 3/1993 |
| JP | 05254770 | A * | 10/1993 |
| JP | 08177341 |   | 7/1996 |
| WO | WO 01/01191 |   | 1/2001 |

* cited by examiner

*Primary Examiner*—Lincoln Donovan
*Assistant Examiner*—Eduardo Colon Santana
(74) *Attorney, Agent, or Firm*—Fraser Clemens Martin & Miller LLC; William J. Clemens

(57) ABSTRACT

A wall plate for use in an elevator installation has a glass part divided into segments, the transparency of which is individually controllable with physical magnitude information signals. A control device is connected to the segments for controlling the transparency on the basis of qualitative and quantitative state information and by linking the state information with the controlling magnitude information signals.

8 Claims, 4 Drawing Sheets

WALL PLATE WITH GLASS PART FOR AN ELEVATOR INSTALLATION

BACKGROUND OF THE INVENTION

The present invention relates to a wall plate with a glass part for an elevator installation and to an elevator installation with such a wall plate.

By the term wall plate for an elevator installation there is to be understood, within the scope of the present description, plates for different boundaries of elevator shafts and elevator cars, thus not only plates for side walls, but also for floors, ceilings, doors or door panels, and windows. The components denoted as wall plates in that case do not have to be geometrically exact, but only approximately plate-shaped.

Wall plates of elevator shafts and elevator cars in many cases have at least partial regions of glass or glass parts, wherein the glass can be fully transparent or opaque.

Aesthetically appealing arrangements are achieved with, in particular, fully transparent glass and a contribution to user comfort can be made if a certain degree of looking out or looking in or looking through is possible. For example, the instantaneous stopping position of the elevator car can thereby be more readily recognized. An elevator user who is waiting can also see whether an elevator car is free or whether, in a given case other users with whom he or she does not wish to travel are in the elevator car.

On the other hand, as a consequence of such glass parts the user also obtains a view in and a view out which are not necessarily aesthetic. Moreover, in the case of certain users in an elevator car with transparent walls, which are arranged in a transparent elevator shaft, anxiety can also develop if the elevator car is located in the region of floors that are high up. In addition, users waiting in front of a shaft door can catch views of users in the elevator car moving past, which in a given case are perceived by the latter as unpleasant. All this could be avoided if only wall plates without transparent regions or without glass parts were used for the elevator installation, but the advantages created by wall plates with glass parts would thereby also be relinquished.

In order to combine the advantages of wall plates with transparent glass parts with the advantages of non-transparent wall plates there are known elevator installations in which the shaft doors substantially consist of a wall plate with a plate-size glass area, wherein there is used for the glass area a special glass which is known per se and the transparency of which can be changed as a whole in that it is subjected to electrical voltage. Depending on the respectively applied electrical voltage, the glass then appears as transparent or as opaque or non-transparent.

A disadvantage of that type of glass is that only the entire wall plate can be changed uniformly with respect to the transparency thereof, so that it is not possible to provide respectively adapted arrangements for different operating situations of an elevator installation.

SUMMARY OF THE INVENTION

The present invention concerns a wall plate for an elevator installation, the wall plate having an integral glass part divided into at least two segments, the at least two segments having individually controllable transparency. It is therefore the object of the present invention to create a wall plate, of the kind stated in the introduction, by which the disadvantages of the state of the art are avoided and to propose an elevator installation with a wall plate of that kind.

The new wall plate comprises a glass part that consists of a special glass, the transparency of which is controllable locally and in terms of time. The glass part is divided into segments or is composed of several segments. The transparency of each segment is controllable individually and independently of the remaining segments.

The segments preferably abut one another in substantially seamless manner. The shapes and dimensions of the segments are dependent on the effects that are to be achieved by the individual controlling of transparency.

A control device is provided for controlling the transparency of the segments. The control device controls the transparency of the individual segments on the basis of state information by linking the state information with those physical magnitudes, the function of which describes the transparency of the segments.

By state information there are understood one or more items of detail information. As examples, there are: temperature information, which describes the temperature in the elevator shaft or in the elevator car or in the environment; brightness information; time information, which includes particularly day of the week and/or clock time; function information, which communicates the function or a dysfunction within the elevator installation; positional information, which gives details about the instantaneous position of the elevator car; user information, which relates to the respective user, particularly in the elevator car; and operating information, which relates to the operating state of the elevator installation, such as, for example, normal travel, express travel, panorama travel, service travel, emergency case, etc.

The linking by which the control device operates is presettable. It can either be fixedly preset once or it can be newly preset or established each time in correspondence with the preconditions and conditions.

The linking contains, for example, rules about the utilization of the state information or having influence on the transparency of the individual segments.

As already mentioned, each segment is individually controllable, which does not, however, exclude the possibility in certain cases of controlling groups of segments or all segments to have the same transparency. Insofar as different degrees of transparency are imparted to the various segments, patterns in the wall plates or in the glass parts of the wall plates can be produced.

Patterns can arise in the sense of a rastered image, wherein such a pattern can be produced to be finer the smaller the individual elements are dimensioned, particularly relative to the glass parts or wall plates. However, patterns can also be produced in that segments are used in special shapes, for example in the form of circles or honeycombs. In that case, the segments preferably have to be so shaped and arranged that they act to cover the area in their entirety, although patterns can also be produced by alternate arrangement of segments with and without controllable transparency. Moreover, control of the transparency of the individual segments can also be undertaken in such a manner that a pattern is temporarily produced which communicates information, for example details of the instantaneous floor.

The new wall plates which have a glass part with selectively controllable transparency can be used for various kinds of wall members or walls. In particular, the wall plates can form interfaces for connection of the control equipment and can comprise a frame enclosing the glass parts at all sides or can form only mounts for individual edges, for example for the upper edge and lower edge of glass parts.

Such wall plates can be used in different ways at elevator installations. On the one hand, viewing at the elevator shaft and at the elevator car, which means views out or views in depending on the respective location, can change. On the other hand, input units and/or display units, which are to be visible only in case of need, can be arranged behind such glass regions or segments.

With the change in the viewing, a form of railings or barrier can be produced—or, better stated, simulated—at, for example, the walls of the elevator car in that the transparency of the glass region is so controlled segmentally that it is transparent at the top and opaque at the bottom. Thus it is possible to avoid giving rise to anxiety of a user of the elevator. In addition, with the help of a sensor the head height of the user can be established and the transparency so controlled that the user can have a comfortable view out notwithstanding the barrier effect.

If an elevator car moves in an elevator shaft that is locally unsightly due to technical equipment or dirt then the transparency of the glass areas of the elevator car moving past can be so controlled that one or more walls of the elevator car is or are opaque until the elevator car has left the unsightly location. In a manner which is reciprocal to a certain extent a temporary view out of the elevator car can be made possible in that a simulated window in an otherwise opaque wall is made transparent so that text or pictograms are readable at the inner wall of the elevator shaft while the elevator car moves past them.

Similarly to the change in viewing, the transparency of the shaft doors and the car doors can also be controlled according to need. Views are desired, for example, for safety reasons so that a potential elevator user can immediately recognize whether other persons, who may be disagreeable to him or her, in a given case also dogs, are in the elevator car. On the other hand, undesired views into the elevator car, for example from below, can be avoided. The transparency of the glass areas at the shaft doors and at the car doors can in that case be so controlled that these are transparent only at times of low usage, thus, for example, at night or—in office buildings—on non-work days.

Apart from use of the new wall plates for change in viewing, this can also be used, as already explained, to make input units, for example with buttons or in the form of touchscreens, and/or display units of digital or analog form, visible only when this is desired or necessary. Input and/or display units can be arranged at the outside of the elevator shaft and/or at the inside of the elevator car.

For this purpose, a wall plate is so arranged that the glass part or segments of the glass part cover the input or display unit. The transparency of the glass part or of the segments thereof is so controlled that in general they are opaque. Through a temporary changeover the input and/or display units can be made entirely or partly visible in that the corresponding segments are made transparent. Such a changeover can proceed either automatically or they can be undertaken by special measures which, for example, a maintenance operative or a user of the elevator can take, or which can be carried out by the elevator control itself. A user can make the input and/or display unit visible by, for example, pressing a button or introducing a chip card or a key at an appropriate position. Making the input and/or display unit visible can also be carried out automatically in emergency situations or in the case of dysfunctions of the elevator installation or can be initiated by a maintenance center.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Opaque segments and segments with reduced transparency are illustrated in solid black in the figures described above.

Figure 1:
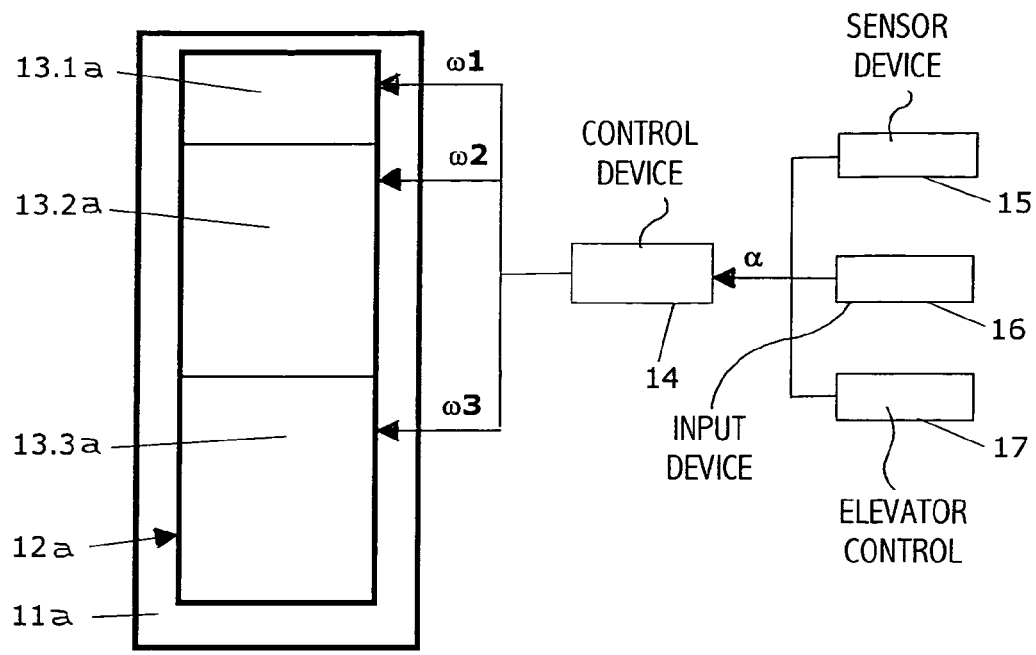
FIG. 1 is a schematic view of a wall plate, according to a first embodiment of the present invention, with a glass area divided into segments and a control device.

FIG. 1 shows a first embodiment wall plate 10a according to the present invention for an elevator installation, which can be used for mounting not only at an elevator shaft, but also at an elevator car. The wall plate 10a comprises a frame 11a extending about and retaining an edge of a glass part 12a. The glass part 12a is divided into three segments 13.1a, 13.2a and 13.3a. A control device 14, which is illustrated only schematically, serves the purpose of linking physical magnitudes ω1, ω2, ω3, the function of which is influencing the transparency of the segments 13.1a, 13.2a and 13.3a respectively, with a state information α on the basis of which the transparency of the segments 13.1a, 13.2a and 13.3a is to be set. The state information α can contain several items of information, wherein the state information α or the items of information can be ascertained by way of a sensor device 15, input by way of an input device 16, or input by way of an (digital) interface (not shown), or preset by a elevator control 17.

Figure 2A:
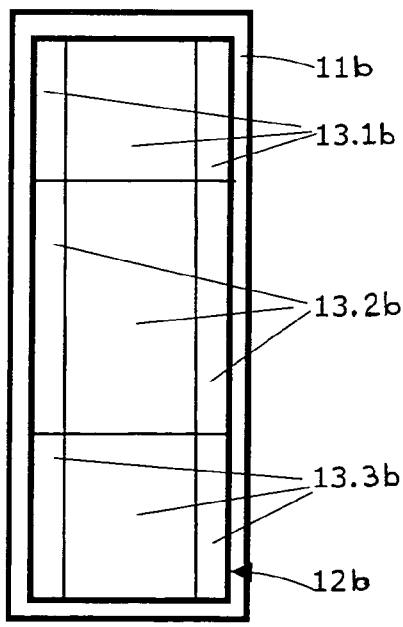
FIG. 2A is a schematic view of a wall plate, according to a second embodiment of the present invention, with a glass area divided into segments.

A second embodiment wall plate 10b according to the present invention is illustrated in FIG. 2A for an elevator installation and comprises a frame 11b retaining a glass part 12b. The glass part 12a is divided into nine rectangular segments 13, the transparency of which is individually controllable. As shown, three rows of segments 13.1b, 13.2b and 13.3b are subdivided into wider central segments positioned between two narrower side segments.

Figure 2B:
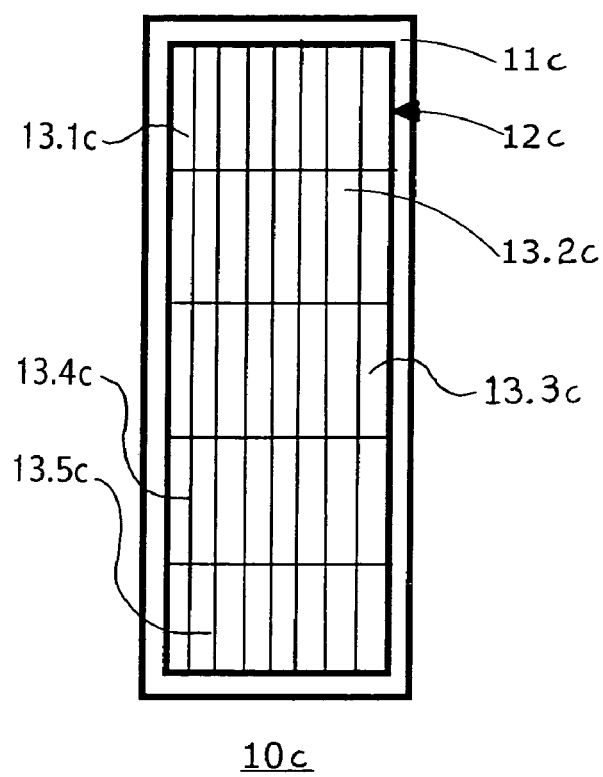
FIG. 2B is a schematic view of a wall plate, according to a third embodiment of the present invention, with a glass area divided into segments.

FIG. 2B shows a third embodiment wall plate 10c according to the present invention for an elevator installation, similarly with a frame 11c and a glass part 12c, wherein the glass part 12c is divided into forty rectangular segments 13.1c, 13.2c, 13.3c, 13.4c and 13.5c in five rows of eight segments each. These segments are smaller than the segments of the glass part 12b shown in FIG. 2A. The fine subdivision of the glass part 12c into numerous segments makes it possible to visualize, with the help of different levels of transparency, images or text in the form of a rastered image.

Figure 2C:
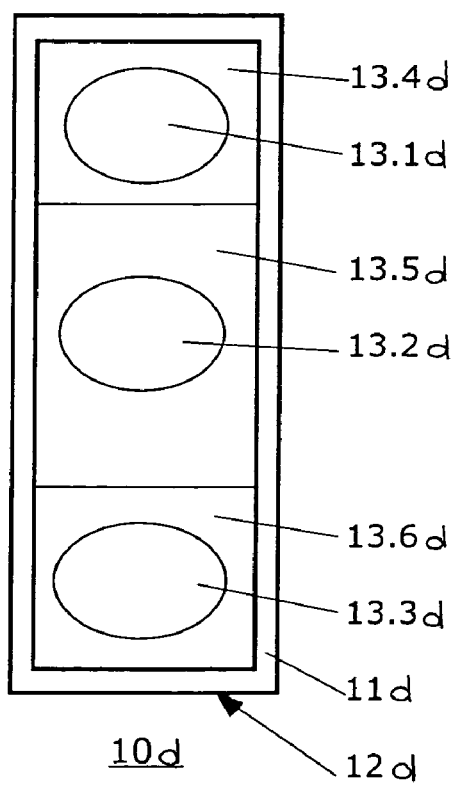
FIG. 2C is a schematic view of a wall plate, according to a fourth embodiment of the present invention, with a glass area divided into segments.

FIG. 2C shows yet a fourth embodiment wall plate 10d according to the present invention for an elevator installation, again with a frame 11d surrounding a glass part 12d. The glass part 12d is divided into six segments 13.1d through 13.6d. The segments 13.1d to 13.3d are oval and arranged one above the other. Each of the oval segments 13.1d to 13.3d is arranged within a rectangular segment 13.4d through 13.6d respectively.

The various segments 13.xx of the various glass parts 12x illustrated in FIGS. 1, 2A, 2B and 2C are individually controllable in each instance so that the transparency of each segment in each glass part is individually controllable or settable.

Figure 3A:
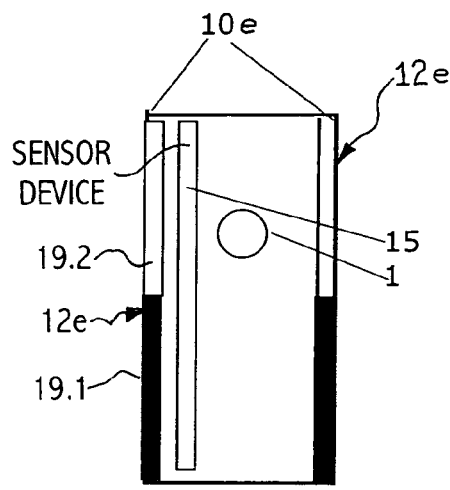
FIG. 3A is a schematic view an elevator car with side wall plates, according to the present invention, of which each has an almost plate-size glass area in which the transparency of the segments is controllable in dependence on the size of a user, together with a first, standing user.
Figure 3B:
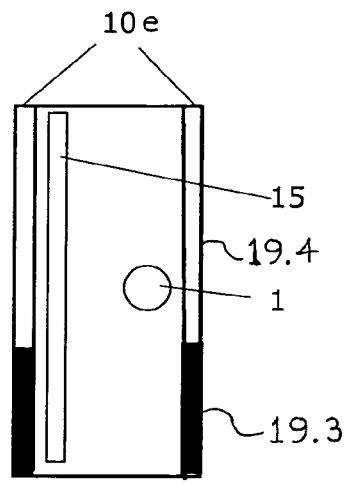
FIG. 3B shows the elevator car illustrated in FIG. 3A with a second, smaller user seated in a wheelchair.

FIG. 3A and 3B each show an elevator car 20 of an elevator installation, which is otherwise not illustrated further. The walls of the elevator car 20 comprise wall plates 10e that are formed substantially by glass parts 12e according to a fifth embodiment of the present invention. The glass parts 12e are, as described with reference to FIGS. 1, 2A, 2B and 2C, subdivided into segments, wherein this subdivision is not indicated in detail in FIGS. 3A and 3B. A head 1 of a user (body not shown) of the elevator car 20 is illustrated schematically by a circle. The head height of the user of the elevator car 20 is established by the sensor device 15 and the transparency of the segments is so controlled that all of the glass parts 12e or areas thereof are opaque up to approximately the usual height of the chest of the user and are transparent above that. The view out for the user is thereby reduced to a specific height region of the elevator car 20 and anxiety, which can happen when the walls of the elevator car are fully transparent to the floor, can be avoided.

The control device, which is not illustrated here, in that case links the height of the head 1 of the user with the selection of the segments to be controlled to be opaque. For example, in FIG. 3A, the user is standing so that a lower area 19.1 is opaque and an upper area 19.2 is transparent. In FIG. 3B, the user is sitting, as in a wheelchair, so that a lower area 19.3 is opaque and an upper area 19.4 is transparent. During travel of the elevator car 20 this selection of the segments does not change in the illustrated example. However, it is conceivable that on reaching the lower floors the optical barrier produced by the opaque region is reduced or eliminated entirely.

Figure 4:
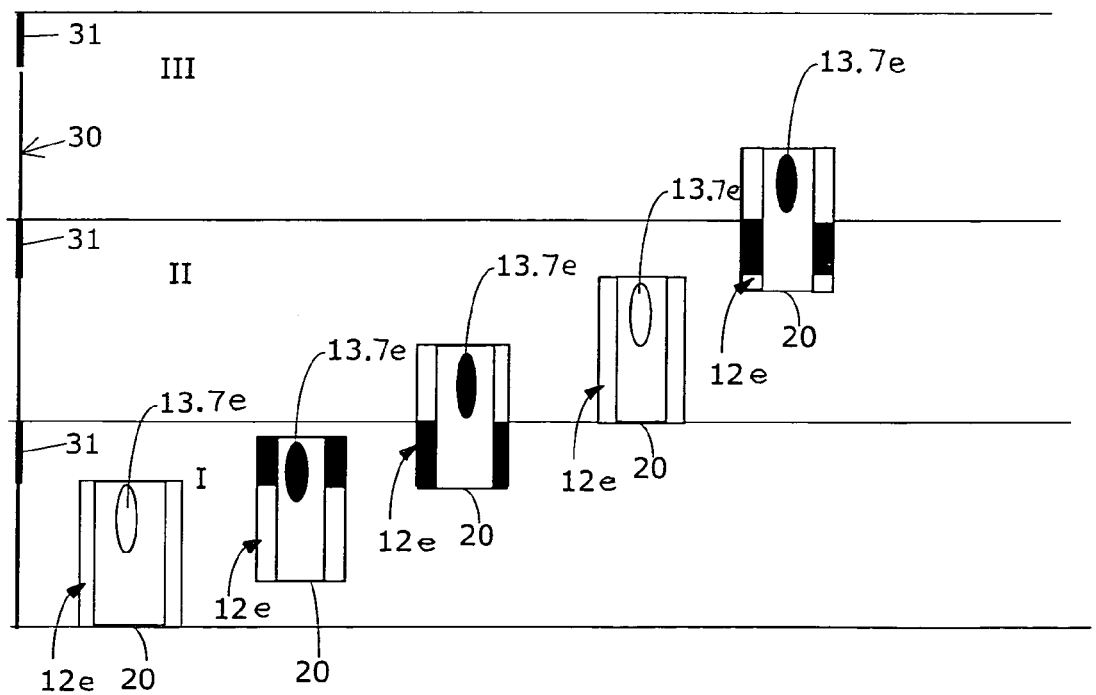
FIG. 4 is a schematic view an elevator installation in which the transparency of the segments at a wall plate of the elevator car is controllable in dependence on the position of the elevator car, wherein the elevator car is illustrated in five different height positions.

FIG. 4 shows an elevator installation which extends over at least three floors I, II and III. The elevator car 20 is illustrated in five different positions, which are adopted in succession during upward travel in an elevator shaft. Of the elevator shaft in which the elevator car 20 is disposed there is illustrated only one wall 30, at the left in FIG. 4. In the upper part of each of the floors I, II and III the elevator shaft is bounded by a side wall member 31 which is usually dirty and unsightly. The wall, which faces the wall 30 of the elevator shaft, of the elevator car 20 has wall plates with the glass parts 12e. The glass parts 12e are divided into segments in the form of horizontal strips, the transparency of which is individually controllable. A rear wall, which lies in the plane of the drawing in FIG. 4, of the elevator car 20 has a wall plate which possesses an optional glass part consisting of an oval segment 13.7e with controllable transparency. The oval segment 13.7e is aligned each time, as soon as the elevator car 20 is at the correct height, with writing (not shown) on the opposite rear wall of the elevator shaft, which indicates at which floor the elevator car 20 is disposed. The control device in the case of this arrangement links the instantaneous position of the elevator car 20 with the selection of the segments to be controlled to be opaque. If the elevator car 20 moves, then this selection changes as shown.

In the position illustrated in FIG. 4 at the left the elevator car 20 is disposed at the height of the floor I. All segments of the glass part 12e of the wall plate, which form the lefthand side wall of the elevator car 20, are so controlled with respect to their transparency that they are completely transparent. In addition, the oval segment 13.7e of the rear wall of the elevator car 20 is completely transparent.

The elevator car 20 shown at the right thereof is disposed at a higher position. In order to prevent the view of the user onto the dirty wall part 31, the segments of the glass parts 12e, which coincide in terms of height with this wall part 31, are so controlled with respect to their transparency that they are no longer completely transparent, but are opaque. In addition, the oval glass part 13.7e of the rear wall of the elevator car 20 is so controlled that it is opaque.

The center one of the elevator cars 20 shown in FIG. 4 is in an even higher position, in which it already projects into the floor II. Here, too, the segments, which coincide in terms of height with the dirty piece of wall 31, of the glass part 12e of the opposite wall of the elevator car 20 are so controlled with respect to their transparency that they are no longer completely transparent, but are opaque. The oval glass part 13.7e of the rear wall is still controlled so that it is opaque. It is obvious that in this case different segments are opaque than in the case of another illustrated position of the elevator car 20.

At the right thereof there is shown the elevator car 20 at the height of the floor II. The control of the transparency of the glass parts 12e and the segment 13.7e is carried out in the same manner as if the car is disposed at the floor I, as illustrated in FIG. 4 at the far left.

Entirely at the right in FIG. 4 there is shown the elevator car 20 between the floors II and III. Here, too, control of the transparency of the glass parts 12e and the segment 13.7e is so carried out that the view of users cannot be onto the unsightly piece of wall 31.

Figure 5A:
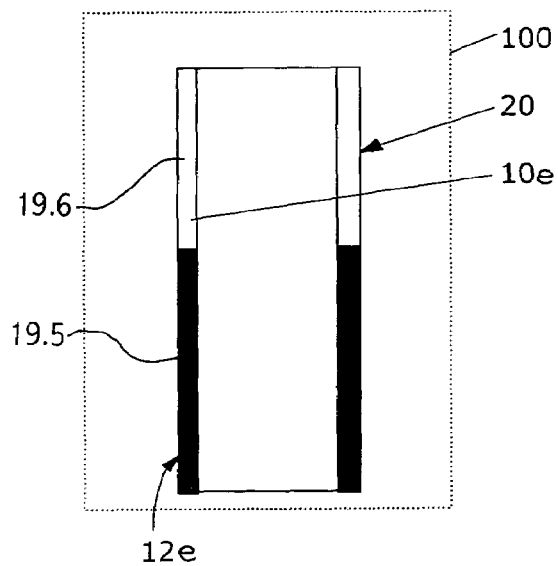
FIG. 5A is a schematic view an elevator car with side wall plates which have a glass area, in which the transparency of the segments is controllable in dependence on the brightness of the environment or the clock time, in a first state.
Figure 5B:
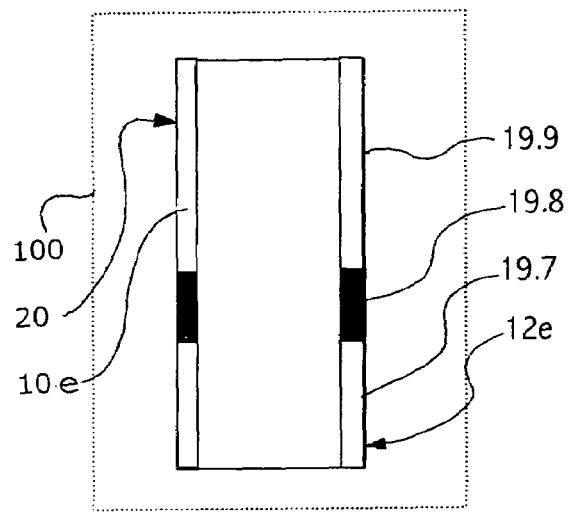
FIG. 5B shows the elevator car illustrated in FIG. 5B, in a second state.

FIGS. 5A and 5B show the elevator car 20 in an environment 100, with the wall plates 10e of the glass parts 12e, which are subdivided into individually controllable segments. The transparency of the segments is controllable, wherein the sensor device 15 (not shown) establishes the brightness of the environment 100 and this brightness is the state information $\alpha$ or an item of information. If the brightness lies above a certain limit value, i.e. during the day, then according to FIG. 5A the transparency of the segments is so controlled that the glass parts 12e in a lower area or region 19.5 of the side walls of the elevator car 20 are opaque, so that a view in and view out are possible only at a head height in an upper area or region 19.6. If the brightness lies below this limit value, i.e. at the evening and at night, then according to FIG. 5B the transparency of the segments is so controlled that the glass parts 12e are virtually completely transparent, wherein a form of virtual railing is produced from an opaque area 19.8 bounded by a transparent lower area 19.7 and a transparent upper area 19.9. Instead of linking the brightness as state information $\alpha$ with the magnitude $\omega$, there can also be provided a clock (such as in the control device 14) and the time can be linked with the magnitude $\omega$.

Figure 6:
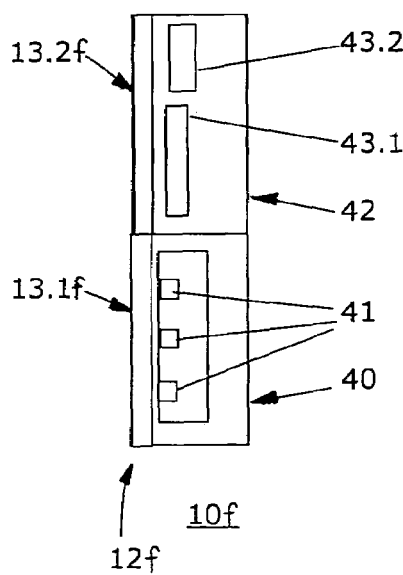
FIG. 6 is a schematic view of a wall plate of an elevator car, wherein two segments cover an input unit and a display unit, respectively.

FIG. 6 shows a sixth embodiment wall plate 10f according to the present invention with a glass part 12f that comprises two segments 13.1f, 13.2f. The segment 13.1f covers an input unit 40, for example with contactlessly operating buttons 41, that can be made visible in special cases or for selected users in that the otherwise opaque or non-transparent segment 13.1f is so changed over that it is completely transparent. Alternatively, the segment 13.1f covers merely a display or text associated with the button 41 and switches this text to be visible or invisible appropriate to the situation. At the same time, the associated buttons, for example a film keyboard, are switched to be active or passive.

By the term "special cases" there are to be understood, for example, cases of emergency or operating states that are out of the ordinary. By selected users there are to be understood, for example, users that have a mechanically and/or electrically effective key by which they can change over the segment 13.1f. The further segment 13.2f is mounted above a display unit 42, which can comprise, for example, an analog display 43.1 and a digital display 43.2, which are to be made visible only in certain cases.

In a further form of embodiment the wall plate is a standard component which is usable in different elevator installations. In order to enable adaptation to local conditions of the elevator installation after mounting, the control can be so designed that certain segments or regions of the wall plate are controlled in such a manner that they appear permanently as non-transparent. The principle of this form of embodiment is explained on the basis of an example. In the case of mounting a shaft door, which has a wall plate according to the invention, it is established that, in the edge region of the wall plate, fastening elements are visible through the glass of the wall plate. In order to now fade out these fastening elements, the control of the wall plate is so adjusted (for example, by appropriate programming steps) that a narrow strip in the edge region of the wall plate is not transparent. See, for example, FIG. 2A. The remaining region is either permanently switched to be transparent, or it can, as in connection with other forms of embodiment, be switched to be transparent or non-transparent according to need.

The wall plate can be so designed that in a special situation, for example in a situation of a case of emergency, a (flat) image screen is made visible, which is disposed behind the wall plate. The image screen can be used for the purpose of producing a visual contact with the outside world while, for example, persons are trapped in the elevator car.

According to the present invention the glass plate 12x has segments 13.xx that are controllable individually or in groups. The glass plate preferably comprises several layers (for example similar to a laminated glass), wherein at least one of the layers is a liquid crystal (LC) layer, the crystals of which are switchable. According to a preferred embodiment these crystals are controlled by a control device which comprises several current sources. If one of the current sources is switched to a current, there arises in the associated segment of the glass plate as a consequence of a potential difference between the layers of the glass plate an electrical field which transfers the crystals into another order state. The transparency in this segment can thereby be influenced. In order to be able to control the individual segments, the glass plate has in at least one of the layers appropriate conductor tracks which are either executed to be so thin that they are hardly visible to the human eye or which are made out of a transparent, conductive material. The current sources of the control device are preferably switchable or controllable individually.

The control device 14 can comprise an (digital) interface or be equipped with means for carrying out an input (for example, a keyboard) so that links can be preset or changed. Functions can also be switched on or switched off by way of the interface or by carrying out an input. Thus, for example, the rules with respect to utilization of the state information can be preset or changed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wall plate for an elevator installation comprising:
   a glass part of an elevator car interior wall or an elevator installation having controllable transparency; and
   at least one of an input unit and a display unit positioned for viewing by an elevator user, wherein said glass part covers said at least one of an input unit and a display unit as viewed by the elevator user and is selectively controlled to make said at least one of an input unit and a display unit alternately visible and invisible to the elevator user.

2. A wall plate for an elevator installation comprising:
   a glass part divided into segments, said segments having individually controllable transparency;
   a control device connected to said segments for controlling a transparency of said segments;
   said glass part being installed in an elevator installation to cover at least one of an input unit and a display unit; and
   said segments being switchable by said control device to be transparent and non-transparent to make said at least one of an input unit and a display unit visible and not visible respectively to an elevator user.

3. The wall plate according to claim 2 wherein buttons of the input unit and displays of the display unit are switchable simultaneously with the transparency and non-transparency, respectively, of an associated one of said segments.

4. The wall plate according to claim 2 wherein said control device connected to said segments for controlling the transparency of said segments controls said transparency on the basis of state information, said state information including at least one of:
   time information;
   function information, which describes a function or a dysfunction of the elevator installation;
   user information concerning a user of the elevator installation; and
   operating information concerning an operating state of the elevator installation.

5. The wall plate according to claim 4 wherein buttons of the input unit and displays of the display unit are switchable simultaneously with the transparency and non-transparency, respectively, of an associated one of said segments and further including at least one of:
   a sensor device connected to said control device for ascertaining said state information automatically;
   an input device connected to said control device for inputting or changing said state information; and
   a connection of said control device to an elevator control for inputting or changing said state information.

6. An elevator installation comprising:
   a control device;
   a wall plate with a glass part divided into at least two segments, said at least two segments having individually controllable transparency;

at least one of an input unit and a display unit;

wherein said control device is connected to said at least two segments for controlling the transparency of said at least two segments;

said glass part covers said at least one of an input unit and a display unit; and said transparency of said at least two segments is switchable to make said at least one of an input unit and a display unit visible and not visible to an elevator user.

7. The elevator installation according to claim 6 wherein said at least one of an input unit and a display unit which is covered by said glass part is arranged outside of an elevator shaft of the elevator installation.

8. The elevator installation according to claim 6 wherein said at least one of an input unit and a display unit which is covered by said glass is arranged inside of an elevator car of the elevator installation.

* * * * *